Aug. 19, 1969   D. R. TIERNEY   3,461,479
TURF VACUUMING APPARATUS

Filed July 25, 1967   3 Sheets-Sheet 1

INVENTOR.
DONALD R. TIERNEY
BY *Fulwider, Patton, Rieber,*
*Lee and Utecht*
ATTORNEYS Aug. 19, 1969  D. R. TIERNEY  3,461,479
TURF VACUUMING APPARATUS
Filed July 25, 1967  3 Sheets-Sheet 2
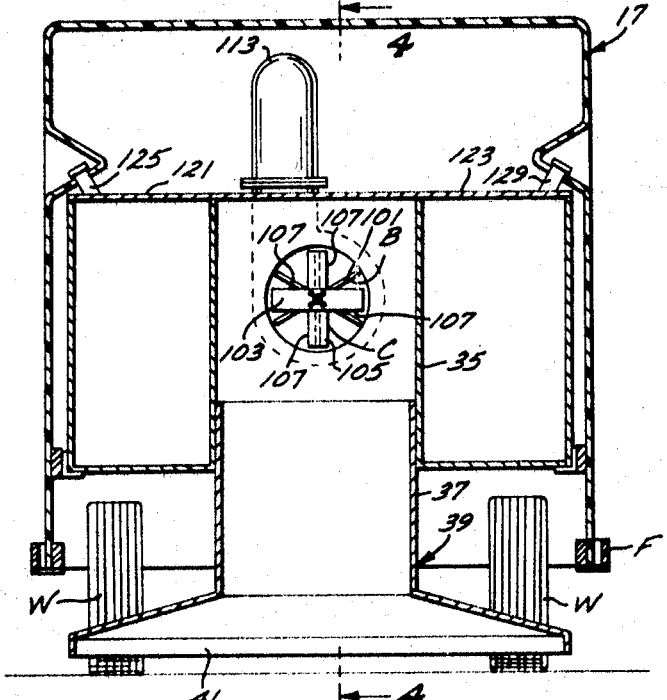
FIG.3
FIG.5
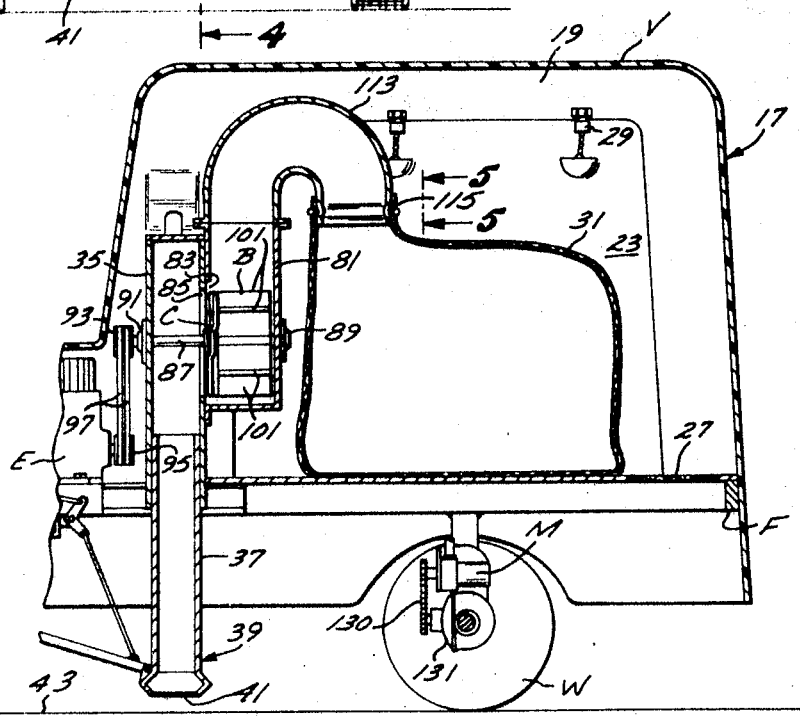
FIG.4
INVENTOR.
DONALD R. TIERNEY
BY Zulwider, Patton, Rieber,
Lee and Utecht
ATTORNEYS Aug. 19, 1969  D. R. TIERNEY  3,461,479
TURF VACUUMING APPARATUS Filed July 25, 1967  3 Sheets-Sheet 3

INVENTOR.
DONALD R. TIERNEY
BY Fulwider, Patton Rieber,
Lee and Utecht
ATTORNEYS United States Patent Office  3,461,479
Patented Aug. 19, 1969

3,461,479
TURF VACUUMING APPARATUS
Donald R. Tierney, Long Beach, Calif., assignor to William F. York and William S. Jensen, doing business as Turf-Vac, Long Beach, Calif., a partnership
Filed July 25, 1967, Ser. No. 655,918
Int. Cl. A471 4/20, 7/00; E01h 1/08
U.S. Cl. 15—339                                     3 Claims

ABSTRACT OF THE DISCLOSURE

A turf vacuuming apparatus including a frame supported by a set of wheels. An intake scoop and debris bag are supported on the frame and the scoop is connected with the debris bag by ducting. A blower assembly creates a partial vacuum in the ducting for pulling air in through the scoop and exhausting it into the debris bag. The blower assembly is driven by an engine which engine also drives a hydraulic pump. A hydraulic motor is drivingly coupled with a pair of the wheels and is connected with the pump by conduit means which includes a flow control valve. Thus the speed of the apparatus can be controlled by the flow control valve while maintaining the blower at its optimum speed.

BACKGROUND OF THE INVENTION

Field of the invention

The present invention relates generally to vacuuming apparatuses and particularly to high capacity vacuuming apparatuses particularly adapted to vacuum cleaning turf.

Description of the prior art

Presently-known existing vacuuming apparatuses do not include satisfactory means for varying the ground speed while maintaining the optimum blower speed.

SUMMARY OF THE INVENTION

The vacuuming apparatus of present invention includes an engine coupled with a blower and also with a hydraulic pump. A hydraulic motor, for driving the apparatus, is driven by the pump and flow therethrough is selectively varied to control the ground speed.

Other objects and features of the invention will become apparent from consideration of the following description taken in connection with the accompanying drawings.

BRIEF DESCRIPTION OF THE DRAWINGS

FIG. 3 is a vertical section view, in enlarged scale, taken along the lines 3—3 of FIG. 2;

FIG. 4 is a broken vertical sectional view taken along the lines 4—4 of FIG. 3;

FIG. 5 is a partial vertical sectional view, in enlarged scale taken along the lines 5—5 of FIG. 4;

DESCRIPTION OF THE PREFERRED EMBODIMENT

Figure 1:
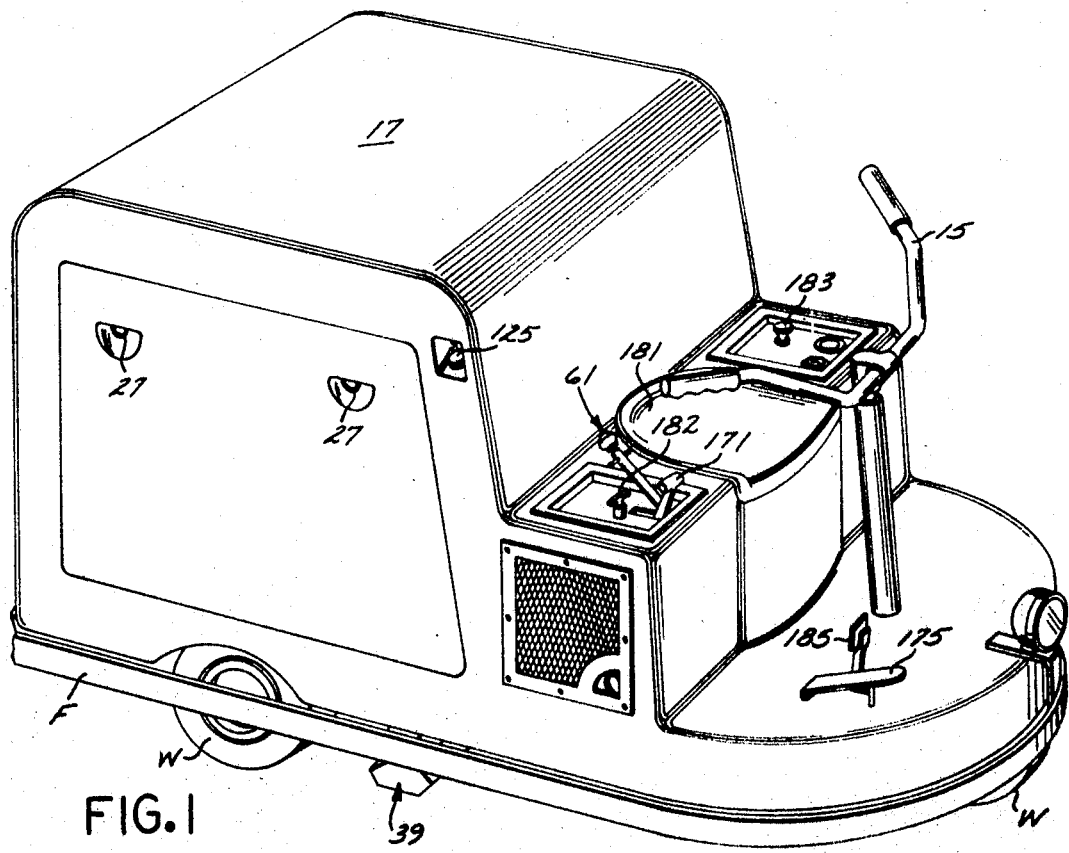
FIG. 1 is a perspective view of a preferred form of turf vacuuming apparatus embodying the present invention.

Referring to the drawings, a preferred form of turf vacuuming apparatus includes a frame F supported on a set of wheels W. The wheels W are driven by a hydraulic motor M, which motor is, in turn, driven by a gasoline engine E. The engine E also drives a blower assembly B which includes a set C of cutter blades (FIG. 3). The engine E is run at a constant speed to drive the blower B and flow through the hydraulic motor M is regulated to control the ground speed of the vacuuming apparatus B.

The wheels W are arranged in tricycle fashion under the frame F and the front wheel is steered by handle bars 15. A formed body 17 is supported on the frame F and defines an inner chamber 19. The opposing sides of the body 17 are formed with openings which are closed by removable doors 23. The doors 23 include hand recesses 25 and the rings 27 from retractable latch mechanisms 29 (FIG. 4) are disposed within the recesses 25. A floor plate 27 forms the bottom of the chamber 19 and a debris bag 31 is removably supported thereon.

Figure 6:
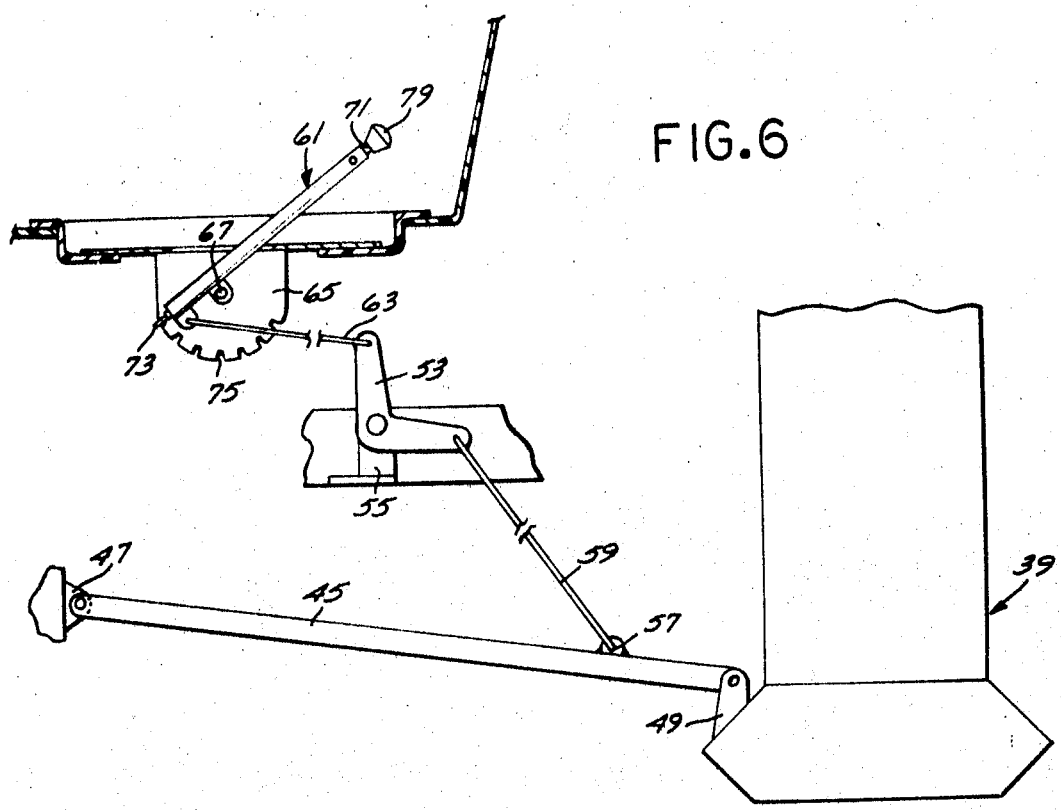
FIG. 6 is a broken vertical sectional view, in enlarged scale, of the mechanism for adjusting the height of the scoop included in said vacuuming apparatus.

A downwardly-opening scoop housing 35 is supported from the frame F and receives the upwardly projecting neck 37 of a scoop, generally designated 39. The lower portion of the scoop 39 flares laterally outwardly and forms a horizontal opening 41 confronting the terrain 43 over which the vacuuming apparatus V is propelled. Referring to FIGS. 4 and 6, a scoop support arm 45 controls the vertical movement of the scoop 39 and is pivotally connected on one end to the frame F by means of a mounting bracket 47 and on the opposite end to a mounting bracket 49 affixed to the scoop 39. A bell crank 53 is pivotally supported from the frame F by a mounting bracket 55 and has one arm connected with a clip 57 on the support arm 45 by a link 59. The other arm of the bell crank 53 is connected with a scoop adjustment handle, generally designated 61, by a link 63. The adjustment handle 61 is pivotally mounted to a mounting plate 65 by a pivot pin 67. The handle 61 is tubular and receives a reciprocating shaft 71 which is bent laterally on its projecting extremity 73 for registering with a selected notch of a plurality of notches 75. A coil spring (not shown) surrounds the shaft 71 and biases it upwardly, as viewed in FIG. 6, to maintain the laterally bent portion 73 registered with the desired notch 75. A knob 79 is screwed onto the upper extremity of the shaft 71 for being grasped by the operator's hand.

A blower housing, generally designated 81, is supported from the back wall of the scoop housing 35 and includes a forwardly-facing opening 83 which confronts an opening 85 in the rear wall of the scoop housing. A blower shaft 87 is supported at its extremities by fittings 89 and 91 affixed to the back wall of the blower housing 81 and the front wall of the scoop housing 35, respectively. The shaft 87 is journaled through the fitting 91 and projects thereahead of and mounts driven pulleys 93 on its forward extremity. The drive shaft of the engine E mounts a pair of drive pulleys 95 which drive the pulleys 93 by means of a pair of endless drive belts 97. The blower B is mounted on the shaft 87 and includes a plurality of radially extending impellers 101 (FIG. 3). The set C of cutters comprise a pair of elongated blades 103 and 105 which are disposed in front of the impellers 101, and are affixed to the shaft 87. Each half of the respective blades 103 and 105 are sharpened on their leading edges 107. A gooseneck duct 113 is connected with the blower housing 81 and includes a circumferential groove 115 which receives a ring-shaped coil spring 117 surrounding the mouth of the debris bag 31.

Referring to FIG. 3, a fuel tank 121 is formed on one side of the blower housing 81 and a hydraulic reservoir 123 is formed on the other side. A filling spout 125 angles upwardly from the top of the fuel tank 121 and projects through the wall of the housing 17. A similar filling spout 129 angles upwardly from the top of the hydraulic fluid reservoir 123.

Figure 7:
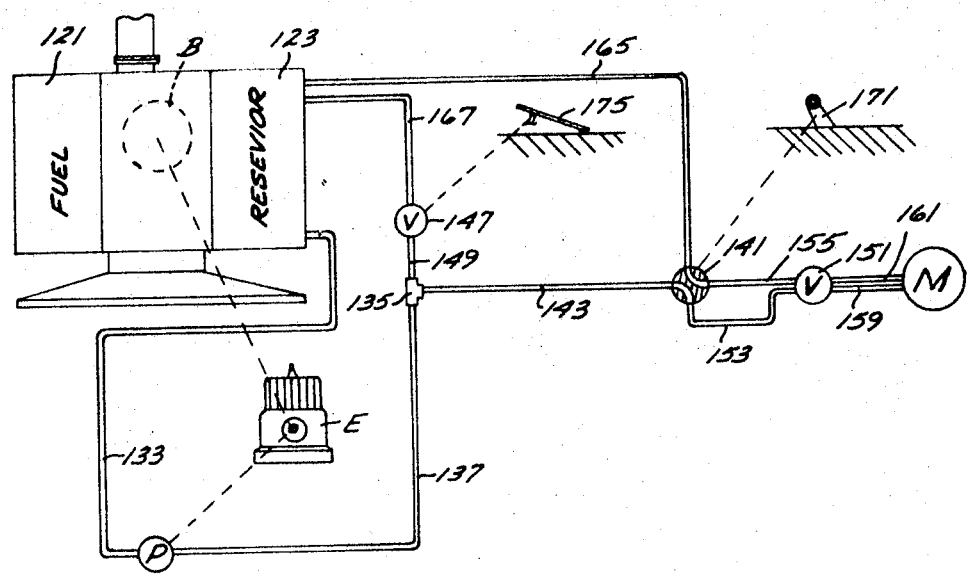
FIG. 7 is a schematic view of a hydraulic system which may be utilized with said vacuuming apparatus.

Referring to FIG. 7, the engine E is mechanically coupled with a hydraulic pump P. The pump P drives the motor M which is coupled to the rear wheels W by an endless drive chain 130 (FIG. 4) which acts through a conventional automobile differential 131. The inlet of the pump P is connected with the hydraulic fluid reservoir 123 by a conduit 133 and the outlet of such pump is connected with a tee-fitting 135 by a conduit 137. One of the remaining legs of the tee 135 is connected with a reversing valve 141 by a conduit 143 and the other leg of the tee 135 is connected with a speed control valve 147 by a conduit 149. One port of the reversing valve 141 is connected with a cushioning valve 151 by a conduit 153 and another port of the reversing valve is also connected with the cushioning valve 151 by a conduit 155. One side of the motor M is connected with one port of the cushioning valve 151 by a conduit 159 and the other side of the motor M is connected with another port of the cushioning valve 151 by a conduit 161. The outlet of the reversing valve 141 is connected with the hydraulic fluid reservoir 123 by a return conduit 165. The outlet of the speed control valve is also connected with reservoir 123 by a return conduit 167.

The reversing valve 141 is controlled between its forward and reverse positions by a directional control handle 171.

The speed control valve 147 is connected with a conventional accelerator pedal 175.

Figure 2:
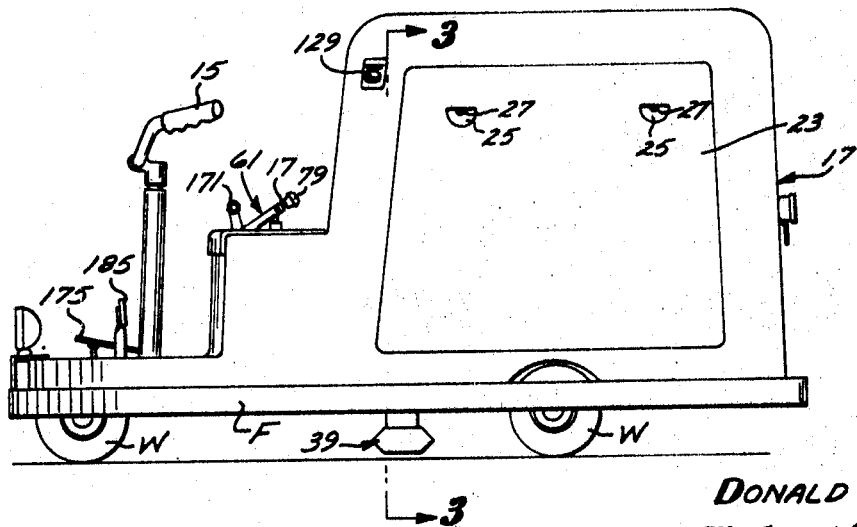
FIG. 2 is a side view, in reduced scale, of the vacuuming apparatus shown in FIG. 1.

Referring to FIGS. 1 and 2, an operator seat 181 is disposed directly behind the handle bars 15 and the scoop control handle 61 is disposed in a conveniently accessible relationship thereto. The reversing handle 171 is disposed beside the handle 61 and a throttle 182 is adjacent thereto. A starter button 183 is provided for starting the engine E. The accelerator pedal 175 is disposed for convenient depression by the right-hand foot of the operator while he is sitting in the seat 181 and a brake pedal 185 is disposed immediately adjacent thereto for actuating brakes associated with the rear wheels W.

In operation, the starter 183 is depressed to start the engine E and, with the accelerator pedal 175 in its undepressed position, the speed control valve 147 remains open for bypassing the hydraulic fluid from the pump P back to the reservoir 123. The throttle 181 is set to operate the engine E at the desired r.p.m. Obviously the r.p.m. at which the engine is to be operated depends on the vacuum necessary to pull the debris in through the scoop opening 41 and deposit it in the bag 31. The scoop positioning handle 61 is then positioned to adjust the scoop 39 to dispose its mouth 41 the desired height from the terrain 43. The positioning of the scoop 39 depends on the size of debris to be picked up and on whether the terrain to be vacuumed is pavement or is planted to grass and on the length of that grass. Forward propulsion of the vacuuming apparatus V is effected by depressing the accelerator pedal 175 to throttle the speed control valve 147 and direct flow from the pump P, through the reversing valve 141 and through the motor M. When the reversing handle 171 is in the position shown in FIG. 7, the motor M will drive the rear wheels W to cause the vacuuming apparatus V to move in a forwardly direction. Continued depression of the accelerator pedal 175 will cause the motor M to correspondingly increase the forward speed of the vacuuming apparatus V and when the valve 147 is fully closed the vacuuming apparatus will be at its top speed.

During the forward movement of the vacuuming apparatus V the mouth 41 of the scoop 39 is passed over the terrain 43 and will draw in the debris lying thereon. The debris pulled up through the scoop 39 will be passed into the scoop housing 35 and will be pulled by the cutter blades 103 and 105, and will then be thrown upwardly through the gooseneck duct 113 and will finally be deposited in the bag 31. Obviously, when the debris is pulled through the rotating blades 103 and 105, it will be chopped into tiny pieces for convenient propulsion through gooseneck duct 113 and storage in the bag 31.

When it is desirable to reverse the direction of the vacuuming apparatus V, the reversing lever 171 will be moved to its forward position thus directing flow in the opposite direction through the motor M and causing the rear drive wheels W to rotate in the opposite direction and move the apparatus V rearwardly.

From the foregoing it will be obvious that the turf vacuuming apparatus of the present invention provides for mulching the debris before it is deposited in the bag 31. This feature is especially advantageous in the case of newspapers and magazines which are picked up by the scoop 39 since they are chopped up into fine pieces which occupy very little space in the bag 31, rather than being wadded-up into space-occupying fluffs of paper. The hydraulic motor and speed control valve arrangement is particularly desirable since it provides for variable control of the ground speed while maintaining the blower B at the desired operating speed. The control afforded by the by pass speed control valve 147 avoids the necessity of slipping clutches to slow the ground speed while maintaining blower speed and provides for rapid response to desired speed changes rather than the sluggish response that would be provided by a mechanical drive train between the engine E and the driven wheels W. In addition, the frequent ground speed changes that are necessary when operating the vacuuming apparatus would induce excessive wear on any mechanical drive.

I claim:
1. A vacuuming apparatus, comprising:
   a frame having a body that defines a closed chamber, said chamber having an air outlet positioned to discharge exhaust air toward the surface being cleaned;
   wheels supporting said frame for movement over the ground;
   a debris bag removably supported on said frame within said chamber;
   an intake scoop supported on said frame;
   ducting interconnecting said scoop and said debris bag;
   an engine on said frame;
   a hydraulic motor drivingly connected with at least one of said wheels;
   a pump driven by said engine;
   conduit means connecting said pump with said motor;
   flow control means in said conduit means for controlling the flow of hydraulic fluid through said motor to selectively vary the ground speed of said frame;
   a blower interposed in said ducting;
   cutter means interposed in said ducting upstream of said blower for mulching debris after it has been drawn upwardly through said intake scoop and before it enters said bag;
   and drive means connecting said engine and said blower and cutter.

2. A vacuuming apparatus as set forth in claim 1, wherein said intake scoop is vertically adjustable relative to said frame.

3. A vacuuming apparatus as set forth in claim 1, wherein said body is provided with door means for replacement of said debris bag.

References Cited

UNITED STATES PATENTS

| | | | |
|---|---|---|---|
| 2,590,734 | 3/1952 | Strong | 15—340 X |
| 1,944,976 | 1/1934 | Hamilton. | |
| 2,529,993 | 11/1950 | Boyce et al. | 15—340 X |
| 2,784,440 | 3/1957 | Newport | 15—340 |
| 2,836,021 | 5/1958 | Wood et al. | 56—501 X |
| 3,105,991 | 10/1963 | Oberg | 15—340 X |
| 3,165,775 | 1/1965 | Lutz | 15—340 |

ROBERT W. MICHELL, Primary Examiner

U.S. Cl. X.R.

15—340, 352